United States Patent [19]
Hoek

[11] Patent Number: 6,109,586
[45] Date of Patent: Aug. 29, 2000

[54] FILLED POLYOLEFIN MIRROR SUPPORT

[75] Inventor: Steven G. Hoek, Holland, Mich.

[73] Assignee: Donnelly Corporation, Holland, Mich.

[21] Appl. No.: 09/097,480

[22] Filed: Jun. 15, 1998

[51] Int. Cl.[7] ............................. A47G 1/24; F16M 13/00; G02B 7/182

[52] U.S. Cl. ......................... 248/476; 248/477; 248/478; 248/479; 248/549; 359/871

[58] Field of Search ..................... 248/548, 549, 248/474, 475.1, 476, 477, 478, 479; 359/871, 872, 873, 874, 876, 877

[56] References Cited

U.S. PATENT DOCUMENTS

| | | | |
|---|---|---|---|
| 4,606,619 | 8/1986 | Yamana et al. | 248/549 |
| 5,005,797 | 4/1991 | Maekawa et al. | 248/479 |
| 5,012,693 | 5/1991 | Enomoto et al. | 74/502.1 |
| 5,268,795 | 12/1993 | Usami | 359/841 |
| 5,432,640 | 7/1995 | Gilbert et al. | 359/841 |
| 5,639,054 | 6/1997 | Gerndt et al. | 248/478 |
| 5,669,698 | 9/1997 | Veldman et al. | 362/83.1 |
| 5,678,945 | 10/1997 | Fimeri | 403/92 |
| 5,781,356 | 7/1998 | Okada et al. | 359/872 |

Primary Examiner—Derek J. Berger
Assistant Examiner—David Heisey
Attorney, Agent, or Firm—Van Dyke, Gardner, Linn & Burkhart, LLP

[57] ABSTRACT

A rearview mirror support bracket for mounting a reflective element in a rearview mirror assembly housing in which the rearview mirror assembly housing is mounted to a vehicle by a vehicle mounting bracket includes a support bracket having a reinforced polyolefin body, and most preferably a glass filled polypropylene body, with a mounting surface for supporting one of electrical actuator and an adapter member and having an arm for connection to the vehicle mounting bracket. The support arm includes a collar for rotatably mounting the rearview mirror support bracket on a post or pivot of the vehicle mounting bracket and includes a plurality of detents for engaging in spaced recesses of the base of the vehicle mounting bracket for releasably coupling the rearview mirror support bracket to the vehicle mounting bracket. Preferably, the detents comprise a dissimilar material from the support bracket, for example a plastic or metal material. The collar may include a spring for urging the collar into engagement with the base of the vehicle mounting bracket to provide a break-away mounting of the rearview mirror support bracket.

67 Claims, 6 Drawing Sheets

FILLED POLYOLEFIN MIRROR SUPPORT

TECHNICAL FIELD AND BACKGROUND OF THE INVENTION

The present invention relates to an exterior rearview mirror for mounting on a vehicle and, more particularly, to an exterior rearview assembly which includes a housing and a reflective element supported in the housing by a support bracket.

Conventional exterior rearview mirror assemblies include a housing and a reflective element which are often supported in the housing by a mirror support bracket. In fixed position assembles, the mirror support bracket is secured to the housing on one end and secured to the vehicle on the other end. In break-away assemblies, the mirror support bracket is fixed at one end to the housing and then pivotally mounted to a mounting bracket at the other end, which in turn is mounted to the vehicle.

Regardless of the type of mounting, present mounting brackets and/or mirror support brackets typically comprise glass filled nylon or polyester. Both these materials have high moduli of elasticity. As a result, these mounting brackets and mirror support brackets have high stiffness and, generally, exhibit good vibration performance. However, in larger mirror assemblies or in mirror assemblies that are extended further from the vehicle, for example in towing mirrors, the glass filled nylon and polyester mirror support brackets and/or mounting brackets add considerable weight to the assemblies. Consequently, the dampening characteristics of these assemblies decrease and, therefore, exhibit increased vibration. In some cases, the support and mounting bracket comprise a metal material, such as aluminum die cast or zinc die cast. Again, the weight of these assemblies is increased and, as a result, the mirror assemblies exhibit increased vibration, which degrades the quality of images reflected by the reflective element. Furthermore, increased vibration may increase the wear and tear on the component parts supported on the exterior rearview mirror.

Consequently there is a need for an exterior rearview mirror assembly that is lighter and yet provides sufficient stiffness for improved operation when mounted the vehicle.

SUMMARY OF THE INVENTION

Accordingly, the present invention provides an improved exterior rearview mirror assembly, especially suited for mounting on a vehicle. The exterior rearview mirror assembly includes a light weight support bracket which exhibits increased dampening and, therefore, reduced vibration. The support bracket can be used in fixed mirror assembly applications or in break-away mirror assembly applications.

According to one aspect of the invention, a rearview mirror support bracket for mounting a reflective element in a rearview mirror assembly housing includes a polyolefin body having a mounting surface for supporting one of an electrical actuator and an adapter member. Furthermore, the body includes an arm which is adapted to mount to a vehicle.

In other forms, the body comprises a fiber reinforced polyolefin. Preferably, the polyolefin material is UV stabilized. In addition, the polyolefin material may be impact modified. Preferably, the support bracket is light in weight, has significant stiffness, and comprises at least a 25% fiber reinforced polyolefin but at most a 60% fiber reinforced polyolefin, more preferably at least 35% fiber reinforced, and most preferably a fiber reinforced polyolefin with about 40% fiber reinforcement. Moreover, the polyolefin material preferably comprises a polypropylene material and, more preferably, a fiber reinforced polypropylene. Reinforcement is preferably with fiber, such as a glass fiber, mineral fiber, or carbon fiber. Most preferably, the reinforcement comprises glass fiber.

In other forms, the arm includes at least one of a projecting member and a recess for engaging a corresponding structure on the vehicle mounting bracket. Preferably the arm includes a plurality of projecting members for engaging the vehicle mounting bracket. In another form, the arm includes at least one insert of a dissimilar material, the insert having at least one raised portion defining the projecting member. For example the dissimilar material may include either a metal material, a glass filled nylon, a plastic or other suitable materials.

In yet further aspects, the arm includes a collar having a transverse passage extending therethrough for receiving a pivot of the vehicle mounting bracket. The projecting members or recesses are positioned on the collar and are circumferentially spaced around the passage for engaging the vehicle mounting bracket. Furthermore, the collar preferably includes a spring for urging the collar into engagement with a base of the vehicle mounting bracket for releasably coupling the mirror support bracket to the vehicle mounting bracket. In other aspects the body of the mirror support bracket is adapted to support an electrical actuator.

According to another aspect of the invention, a rearview mirror assembly includes a housing, which includes a reflective element, and a polypropylene support bracket, which supports the reflective element in the housing. The support bracket is adapted to mount to a vehicle.

In one form, the rearview mirror assembly further includes a vehicle mounting bracket, which is adapted to mount to the vehicle. The support bracket engages the vehicle mounting bracket for mounting the support bracket to the vehicle. Preferably the support bracket releasably engages the vehicle bracket and is adapted to release from engagement with the vehicle mounting bracket when an external force is applied to the rearview mirror assembly. Preferably the vehicle mounting bracket includes a base and a pivot which extends from the base and supports a spring. The support bracket includes a collar for engaging the pivot and is urged into engagement with the base by the spring. One of the base and the collar includes a plurality of projections and the other of the collar and the base includes a plurality of recesses, which cooperate with the projections for releasably coupling the support to the vehicle mounting bracket. For example, the projections may comprise one of a metal insert and a plastic insert. The inserts are preferably provided on the collar of the support bracket. For example, the projections may comprise glass filled nylon inserts. Furthermore, the inserts are preferably uniformly circumferentially spaced around the transverse passage of the collar. Each insert and recess includes camming surfaces for guiding the housing to pivot about the pivot when an external force is applied to the housing having sufficient magnitude to compress the spring.

As will be understood from the foregoing, the exterior rearview mirror assembly of the present invention provides numerous advantages over the prior known mirror assemblies. The assembly includes a support bracket which, when formed from the preferred polypropylene material, has a lower density than most conventional support brackets and yet provides superior vibration dampening for the exterior rearview mirror assembly while being significantly lower in cost. The support bracket, therefore, reduces the overall weight of the mirror assembly.

These and other objects, advantages, purposes, and features of the invention will become more apparent from the study of the following description taken in conjunction of the drawings.

DESCRIPTION OF THE PREFERRED EMBODIMENTS

Figure 1:
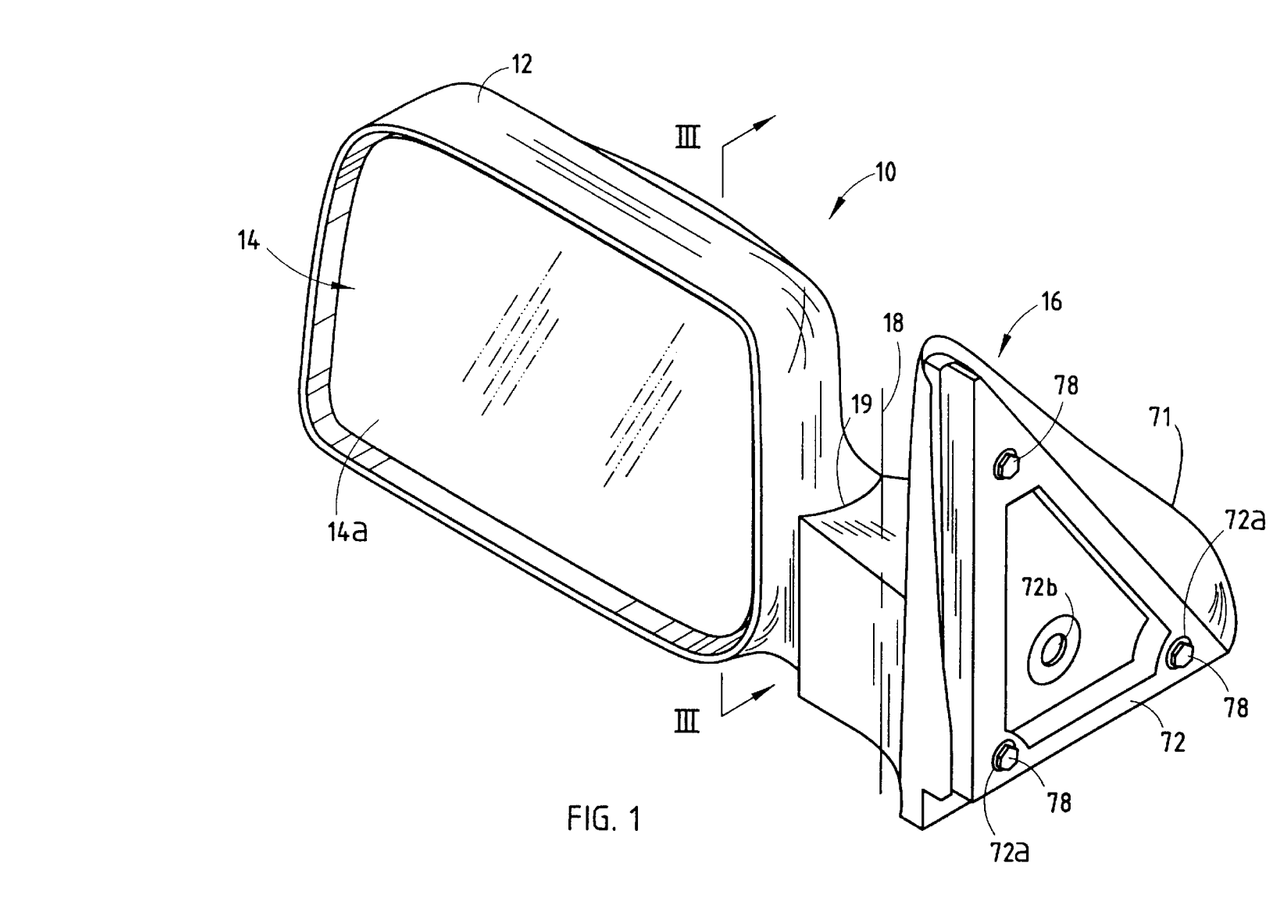
FIG. 1 is a perspective view of an exterior rearview mirror assembly of the present invention.

Referring to FIG. 1, an exterior rearview mirror assembly 10 of the present invention includes a housing 12, which supports a reflective element assembly 14, and a mounting bracket 16 which mounts housing 12 onto a panel or into the window frame of a window of a vehicle such as a front window (not shown). In the illustrated embodiment, exterior rearview mirror assembly 10 comprises a break-away assembly and is adapted to pivot between a normal operating position in which housing 12 is extended from the vehicle to a folded, break-away position in which the housing 12 is folded about a pivot axis 18 which extends through mounting bracket 16 and breaks away from mounting bracket 16 along line 19 to fold toward the body of the vehicle either forwardly or rearwardly when struck or impacted by an object or with sufficient force.

Figure 2:
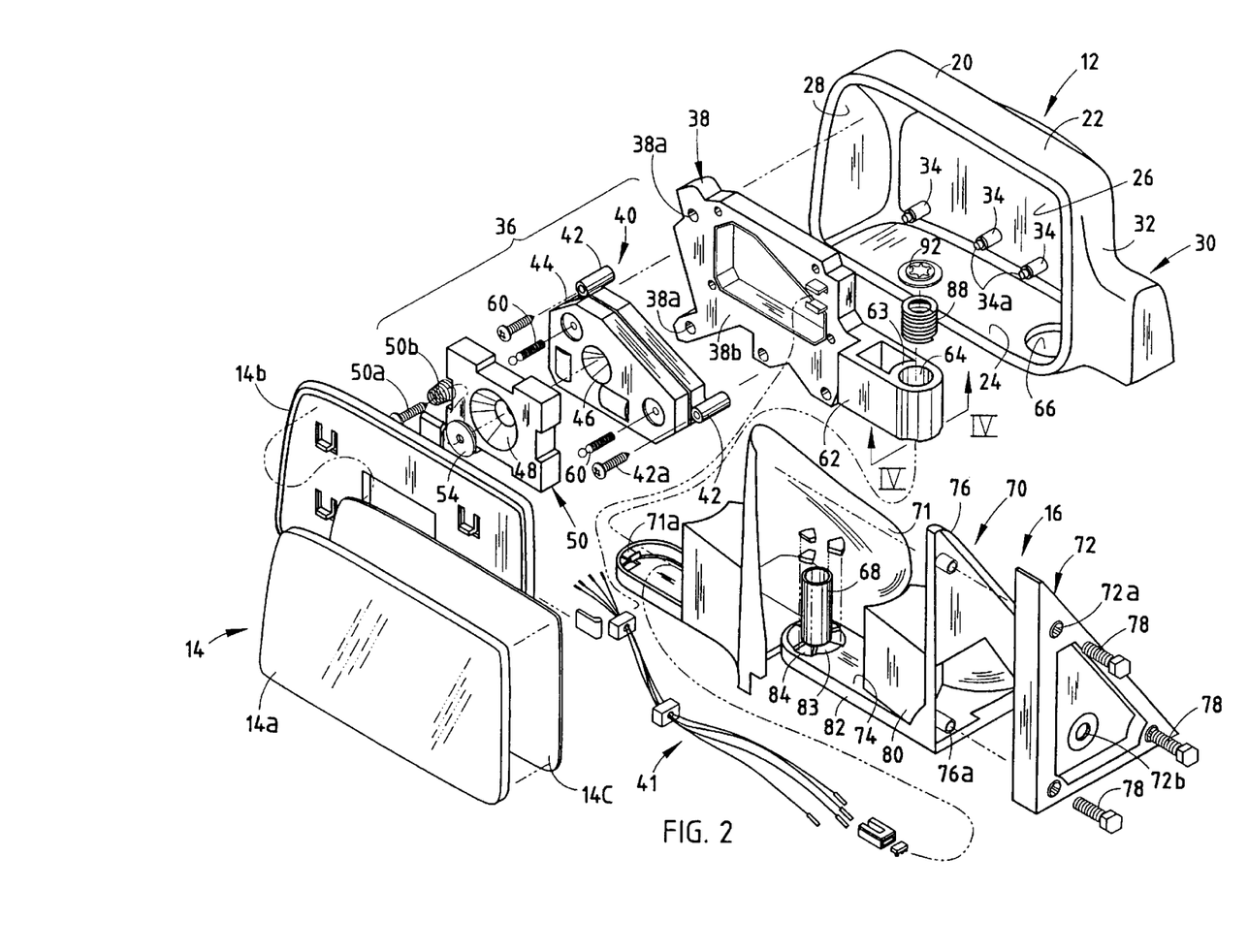
FIG. 2 is an exploded perspective view of the exterior rearview mirror assembly of FIG. 1.

Referring to FIG. 2, reflective element assembly 14 includes a reflective mirror element 14a and a backing plate 14b, which supports the reflective mirror element 14a in housing 12. Reflective element 14a is secured to backing plate 14b by a conventional method, including for example a double sided adhesive layer 14c. Reflective element 14a may comprise a conventional chrome reflective element formed from glass or plastic with a chrome or other reflective layer on its first or second surface. Alternately, reflective element 14a may comprise a variable reflectance, electro-optic mirror element, such as an electrochromic cell.

Housing 12 preferably comprises a modular housing and includes a housing wall 20 having a upper section or wall 22, a lower section or wall 24, a back section or rear wall 26, an end section or outer wall 28, and a mounting arm 30 which extends from a vehicle facing side 32 of housing 12 for pivotably mounting housing 12 to the vehicle, as will be more fully discussed below. Projecting inwardly from back wall 26 into the interior of housing 12 are a plurality of mounting bosses 34.

Reflective element 14a and backing plate 14b are supported in housing 12 by a reflective element support assembly 36. As best seen in FIG. 2, reflective element support assembly 36 includes a mirror support bracket 38, which is secured to mounting bosses 34 of housing 12 by a plurality of fasteners or studs 34a which extend from mounting bosses 34 into corresponding mounting holes 38a on bracket 38 to rigidly couple support bracket 38 to housing 12 and, thereby, support housing 12 on support bracket 38. Also mounted to support bracket 38, is an electrical actuator 40 which provides multi-position adjustment of reflective element 14a in housing 12 as is conventionally known in the mirror art. Electrical actuator 40 includes a plurality of mounting bosses 42 which receive fasteners 42a for securing electrical actuator 40 to bracket 38. Reflective element 14a and backing plate 14b are mounted to actuator 40 by an adapter member 50. Again referring to FIG. 2, electrical actuator 40 includes a housing 44, which in the illustrated embodiment comprises a split construction housing, with a pivot socket 46 formed thereon for receiving a corresponding pivot socket 48 on adapter member 50. Adapter member 50 is pivotally secured to electrical actuator housing 44 by a fastener 50a which extends through a pivot coupler or pivot washer 54, which is positioned in socket structure 48, such that adapter member 50 is pivotable on electrical actuator housing 44 about a plurality of axes which pass through the centroid of the socket-to-socket connection to provide multi-axis positioning of reflective element assembly 14. Positioned between the enlarged head of the fastener 50a and pivot washer 54 is a spring which prevents binding of pivot washer 54 on pivot socket 48. Reflective element assembly 14 is secured to adapter member 50 by conventional methods, for example by fasteners or by releasable latch mechanisms (not shown).

Electrical actuator 40 is a conventional electrical actuator, for example, of the type disclosed in pending U.S. patent application entitled HOUSING WITH INTEGRAL ELECTRICAL CONNECTORS FOR A REARVIEW MIRROR ACTUATOR ASSEMBLY filed on Jan. 9, 1997, Ser. No. 08/780,996 by David J. Huizenga et al. and assigned to Donnelly Corporation of Michigan, Holland now issued as U.S. Pat. No. 5,900,999. Preferably, electrical actuator 40 includes a pair of motors (not shown) which drive gearing (also not shown) which in turn drive threaded positioning members 60. Positioning members 60 are adapted to move axially and extend from or retract into housing 44. Positioning members 60 engage the back side of adapter member 50 to pivot adapter member 50 on pivot socket 48 with respect to electrical actuator 40 to provide adjustment of the position of reflective element assembly 14.

Mirror support bracket 38 includes a mounting portion 38b for supporting actuator assembly 40 and an arm 62 for connecting to mounting bracket 16. Arm 62 includes a collar 63, which defines a transverse passage 64. Transverse passage 64 is aligned with an opening 66 provided in lower wall 24 of housing 12 and receives a pivot or pivot bushing 68 provided on mounting bracket 16 in order to pivotally mount housing 12 and support bracket 38 on mounting bracket 16.

Mounting bracket 16 includes a bracket member 70 and an adapter member 72 which is secured to mounting bracket 70 and enables attachment of exterior mirror assembly 10 to a vehicle panel or door. Furthermore, mounting bracket 16 preferably includes a cover 71 which extends over bracket member 70 and adapter member 72 to conceal the mounting hardware and, therefore, provide a more attractive assembly. Cover 71 includes a releasable latch 71a or the like to releasably secure cover 71 to mounting bracket 70. Electrical actuator 40 is preferably electrically coupled to the vehicle electrical system through an electrical cable assembly 41, which extends from electrical actuator 40 through cover 71 and a passage (not shown) provided in guide member 80 and through an access opening 72b provided in adapter member 72 and to the vehicle electrical system.

Mounting bracket 70 includes a base portion 74 and a mounting flange 76, which includes mounting bosses 76a and is secured to adapter member 72 by fasteners 78 which extend through corresponding mounting holes 72a provided on adapter member 72 and into mounting bosses 76a. Base portion 74 includes a guide member 80 adjacent mounting flange 76 and a projecting tongue or plate member 82 on which pivot bushing 68 is mounted, and spaced from guide member 80. Positioned around pivot bushing 68 are a plurality of radially spaced raised portions 83 which define receiving recesses or grooves 84 therebetween. Recesses 84 cooperate with a plurality of projections or projecting members 86 (FIGS. 3 and 4) provided on arm 62 of support 38 to releasably couple housing 12 to mounting bracket 20 and provide a break-away function for assembly 10, as will more fully described below.

Figure 3:
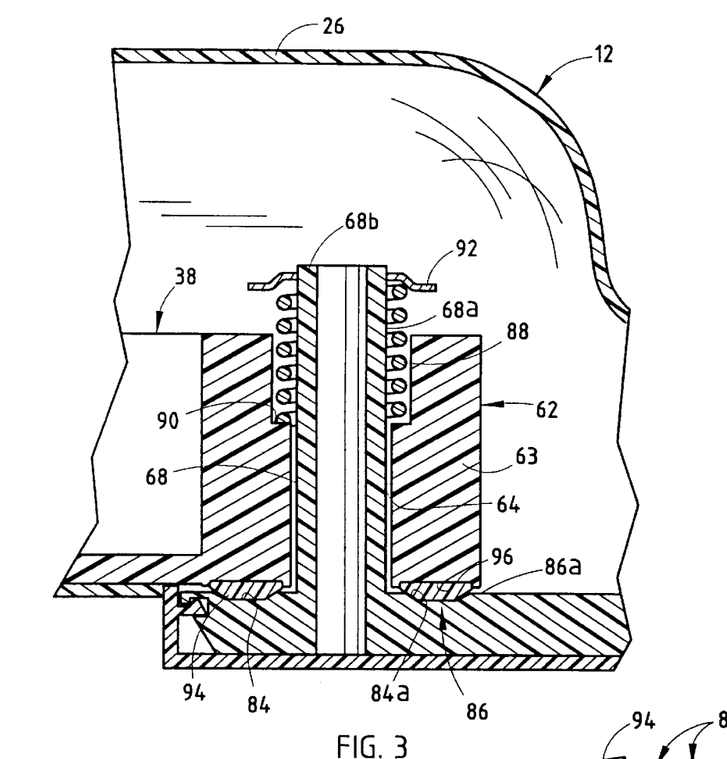
FIG. 3 is a cross-section taken along line III—III of FIG. 1.
Figure 4:
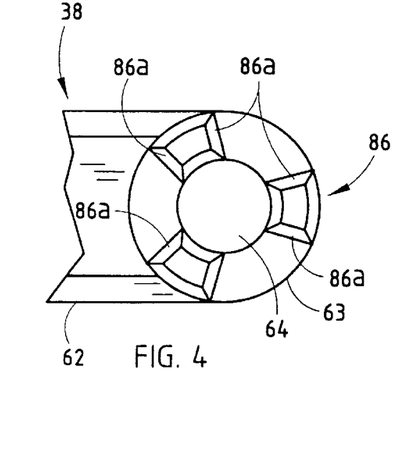
FIG. 4 is plan view of a mirror support bracket of the exterior rearview mirror assembly taken along line IV—IV of FIG. 3.

As best seen in FIGS. 3 and 4, projecting members 86 are positioned on collar 63 and are preferably uniformly spaced around passage 64 to align with recesses 84 provided on base 74. In this manner, when housing 12 is positioned in its normal operating position projecting members 86 extend into and engage with recesses 84. Referring to FIG. 3, pivot bushing 68 extends through passage 64 of arm 62 of support bracket 38 and includes a spring 88, for example a helical coil spring, which is mounted on an end portion 68a of pivot bushing 68. Passage 64 is a stepped passage and includes a shoulder 90 on which spring 88 is supported. Spring 88 is positioned between a stop 92, which is secured on the distal end 68b of pivot bushing 68, and shoulder 90 and is at least slightly compressed by stop 92 to urge support bracket 38 into engagement with base 74 of mounting bracket 16. In the illustrated embodiment, stop 92 comprises a lock washer and is preferably releasably secured to distal end 68b of bushing 68.

Spring 88 is partially compressed to urge mirror support bracket 38 and, more specifically, projecting members 86 into engagement with recesses 84. Referring again to FIG. 3, projecting members 86 include angled bearing surfaces or camming surfaces 86a. Similarly, recesses 84 include a pair of opposed camming surfaces 84a. In this manner when an eccentric, external force is applied to housing 12, camming surfaces 86a of projecting members 86 are guided along camming surfaces 84a of recesses 84 to at least slightly pivot housing 12 on pivot bushing 68. When an eccentric, external force is applied to housing that is sufficient to compress spring 88, camming surfaces 86a of projecting members 86 are guided along camming surfaces 84a until projecting members 86 disengage from recesses 84 and housing 12 pivots on bushing 68 to move from its normal operating position to a folded, break-away position close to adjacent the vehicle.

Preferably, mirror support bracket 38 comprises a polyolefin material and, more preferably, comprises a polypropylene material. More preferably, mirror support bracket 38 comprises a reinforced polyolefin and, most preferably, a reinforced polypropylene material. In preferred form, bracket 38 comprises a fiber reinforced polyolefin. Furthermore, the polyolefin material is preferably at least 25% (by weight) fiber reinforced polyolefin and, more preferably, at least a 35% (by weight) fiber reinforced polyolefin material, but less than 60% (by weight) fiber reinforced. The bracket material is preferably reinforced with fiber or fibers, such as glass fiber, mineral fiber, or carbon fiber. Most preferably, the bracket material is reinforced with glass fiber. Preferably, bracket 38 comprises a glass filled polypropylene, for example THERMOFIL® P7-40F6-0874 or P7-40F6-0684 polypropylene available from Thermofil Inc. of Brighton, Mich. and, most preferably, mirror support bracket 38 comprises a 40% (by weight) glass fiber reinforced, impact modified, UV stabilized, mega chemically coupled homopolymer polypropylene or a 40% (by weight) glass fiber reinforced, UV stabilized, mega chemically coupled homopolymer polypropylene. The polyolefin or polypropylene material preferably has a density in a range of about 1.1 to 1.35 g/cm$^3$, more preferably, in a range of about 1.15 to 1.25 g/cm$^3$, and most preferably in a range of about 1.20 to 1.25 g/cm$^3$. In addition, the polyolefin or polypropylene material has a flexural modulus of at least about 4.0 GPa, more preferably, of about 6.0 GPa, and most preferably per ASTM D790 of at least about 8.0 GPa. In this manner, mirror support bracket 38 comprises a light weight bracket, with low density which significantly reduces the overall weight of mirror assembly 10. Furthermore, mirror assembly 10 exhibits increased vibration dampening and, therefore, reduced vibration and improved vibration performance.

Figure 5:
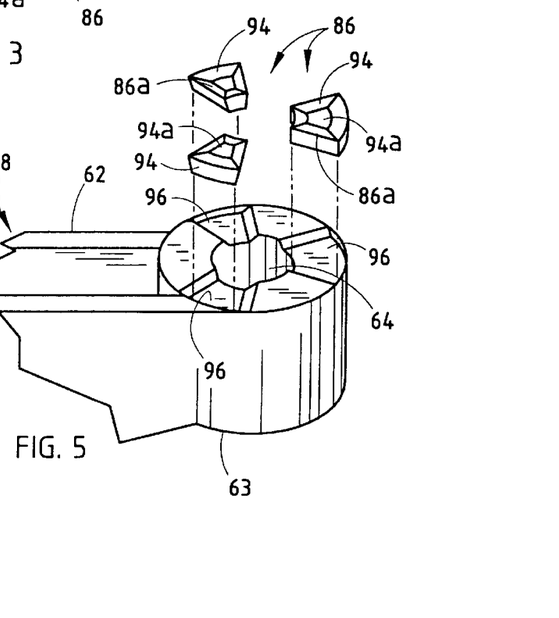
FIG. 5 is an enlarged, exploded perspective view of the mirror support bracket of FIG. 3.

As best seen in FIGS. 3 and 5, projecting members 86 may comprise inserts 94 which are positioned in channel shaped recesses 96 formed on collar 63 of arm 62. Inserts 94 include raised portions 94a for engaging recesses 84 and preferably include angled surfaces defining camming surfaces 86a. As best seen in FIG. 5, inserts 94 comprise radial segment shaped inserts and are circumferentially uniformly spaced around passage 64 of collar member 63 of arm 62. Preferably, inserts 94 comprise nylon or metal inserts. Metal inserts are particularly suitable for heavy mirror applications or mirror applications which include large moment arms and, therefore, need a more substantial, higher density, more durable and wear resistant bearing surface. For example, inserts 94 may comprise a nylon material, including Allied Signal CAPRON 8267, Allied Signal CAPRON 8234, or THERMOFIL nylons, for example LSG440a which have increased creep resistance and heat compression resistance.

Alternately, projecting members 86 may be provided by a plurality of projections formed on a single insert, for example an annular insert (not shown). Again, the annular insert preferably comprises a metal or nylon material, including Allied Signal CAPRON 8267, Allied Signal CAPRON 8234, or THERMOFIL nylons, for example LSG440A.

Figure 6:
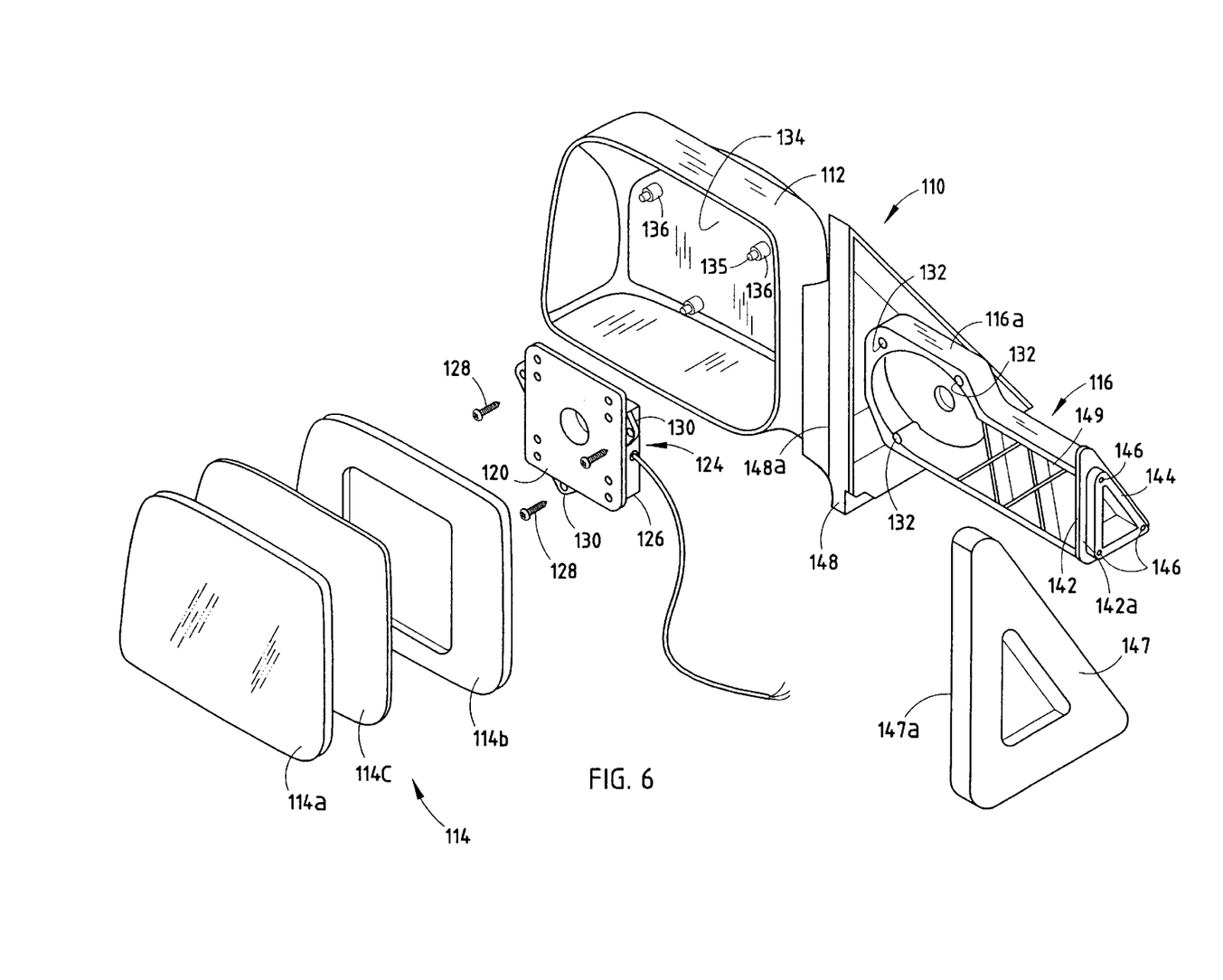
FIG. 6 is an exploded perspective view of a second embodiment of the exterior rearview mirror assembly.

Referring to FIG. 6, a second embodiment 110 of an exterior rearview mirror assembly is illustrated. Exterior rearview mirror assembly 110 includes a housing 112 which supports a reflective element assembly 114. Reflective element assembly 114 is supported in housing on a support bracket 116, which is adapted to mount directly to a vehicle panel or a vehicle door. Therefore, exterior rearview mirror assembly 110 comprises a fixed position exterior rearview mirror assembly.

Reflective element assembly 114 includes a reflective mirror element 114a and a backing plate or member 114b, which supports the reflective mirror element 114a on mirror support bracket 116, as will be more fully described below. Reflective element 114a is preferably secured to backing plate 114b by a double sided adhesive layer 114c. Reflective element 114a may comprise a conventional chrome reflective element formed from glass or plastic with a chrome or other reflective layer on its first or second surface.

Alternately, reflective element 114a may comprise a variable reflectance, electro-optic mirror element, such as an electrochromic cell.

Figure 9:
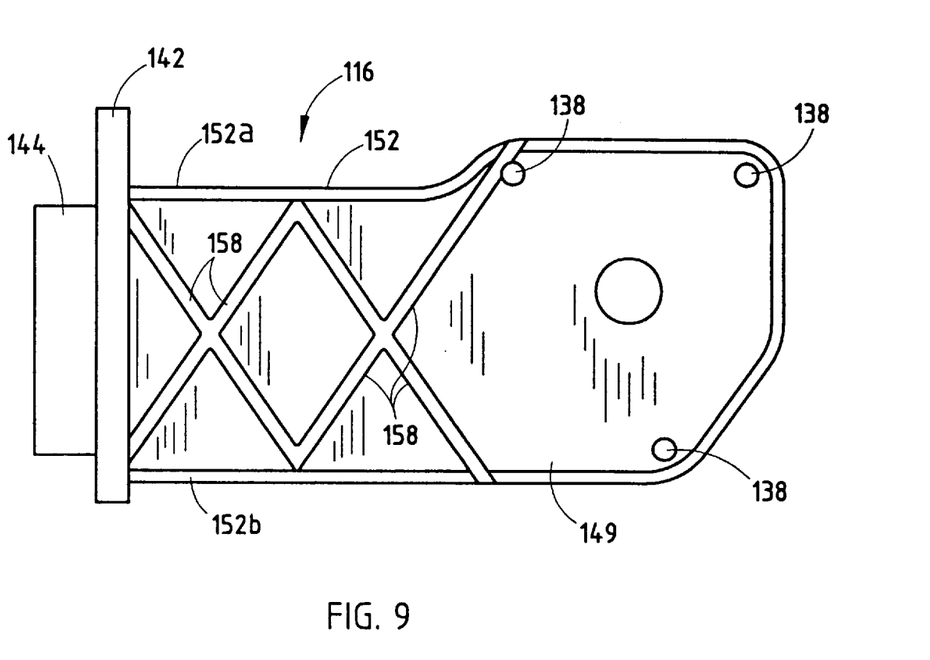
FIG. 9 is a rear elevation of the mirror support bracket of FIG. 7.
Figure 10:
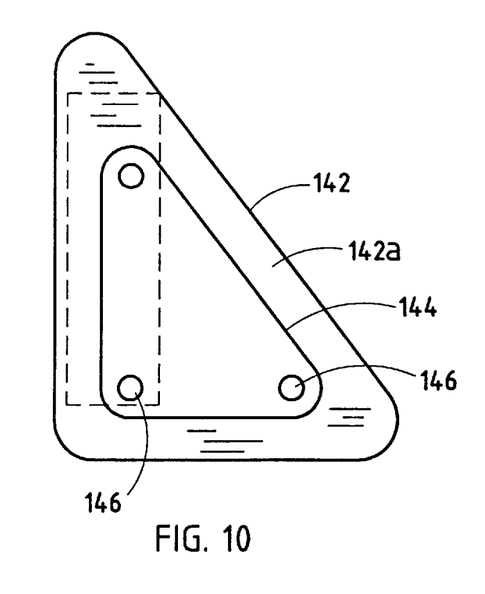
FIG. 10 is an end elevation of the mirror support bracket of FIG. 7.

Backing member or plate 114b is mounting by a conventional method, such as fastening, to an adapter member or plate 120 which is pivotally mounted to electrical actuator assembly 124. Actuator assembly 124 includes a housing 126 and at least one positioning member (not shown) which extends from and retracts into housing 126 of electrical actuator assembly 124 and engages the back side of adapter member 120 to pivot adapter member 120 and reflective element 114 about a plurality of axes to adjust the position of reflective element 114, in a manner similar to assembly 10. Actuator assembly 124 is mounted to support bracket 116 by a plurality of fasteners 128 which extend through corresponding mounting bosses 130 provided on actuator housing 126 and into corresponding threaded apertures 132 provided on support bracket 116. Support bracket 116 is then mounted to a back wall 134 of housing 112 by a plurality of fasteners or studs 135 which extend from a plurality of mounting bosses 136 provided on back wall 134 and into corresponding receiving structures 138 provided on support bracket 116 (FIG. 9). In this manner, actuator assembly 124 and support bracket 116 are rigidly mounted to housing 112.

Support bracket 116 is mounted at a second end 116b by threaded fasteners or studs (not shown) directly to a panel or vehicle door. As best seen in FIG. 6, second end 116b includes a generally triangular shaped mounting flange 142 and a triangular shaped base 144, which projects from a vehicle facing side 142a of mounting flange 142. Base 144 includes a plurality of mounting holes 146 which receive mounting studs (not shown) for securing second end 116b and housing 112 to the vehicle. Mounting flange 142 and base 144 are mounted to the vehicle through a triangular shaped positioning member 147, which adapts the mounting of assembly 110 to a standard door frame. Positioning member 147 receives triangular base 144 and positions flange 142 generally flush with an outer surface 147a of positioning member 147. Preferably, second end 116b of support bracket 116 extends through a triangular shaped cover member 148, which is integrally formed with housing 112. Cover 148 extends over triangular shaped positioning member 147 to provide a protective covering and to conceal the mounting of assembly 110.

Figure 7:
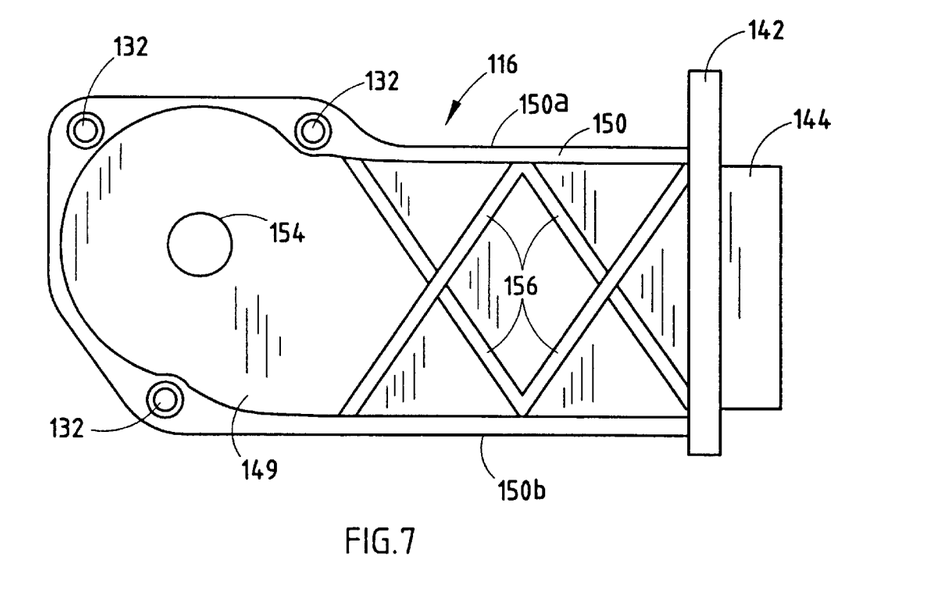
FIG. 7 is a front elevation of a mirror support bracket of the exterior rearview mirror assembly of FIG. 6.
Figure 8:
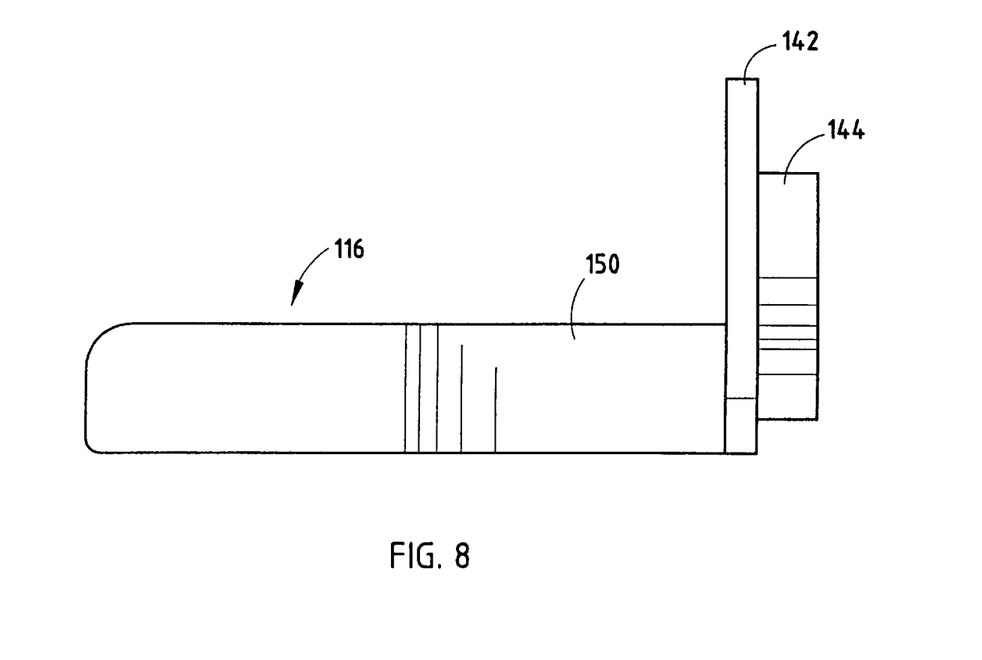
FIG. 8 is a top plan view of the mirror support bracket of FIG. 7.

Referring to FIG. 7, support bracket 116 includes a web wall 148 and perimeter flange walls 150 and 152 which project from opposite sides of web wall 148 and provide reinforcement of web wall. Flange wall 150 includes mounting holes 132 to receive fasteners for mounting electrical actuator assembly 124. Web wall 148 includes a central opening 154, to reduce the weight of the support bracket by eliminating excess material not critical to the stiffness of the support bracket. Opening 154 could also provide access for the electrical wires of electrical actuator 40 to pass through the bracket to connect to vehicle electrical system. Referring to FIGS. 7 and 9, web wall 148 is further reinforced by a plurality of ribs 156 and 158 which extend diagonally between upper and lower portions 150a, 150b of flange wall 150 and between upper and lower portions 152a and 152b of flange wall 152.

Similar to the previous embodiment, support bracket 116 preferably comprises a polyolefin and, more preferably, polypropylene material. Even more preferably, bracket 116 comprises a glass filled polypropylene, for example THERMOFIL® P7-40F6-0874 or P7-40F6-0684 polypropylene available from Thermofil Inc., of Brighton, Mich. Most preferably, mirror support bracket 116 comprises a 40% glass fiber reinforced, impact modified, UV stabilized, mega chemically coupled homopolymer polypropylene or a 40% glass fiber reinforced, UV stabilized, mega chemically coupled homopolymer polypropylene. In this manner, support bracket 116 comprises a light weight, low density member, which significantly reduces the overall weight of the exterior mirror assembly, and yet provides sufficient stiffness and vibration dampening.

Alternately, support bracket 116 and housing 112 may comprise a single integral unitary member with the support bracket 116 and housing 112 being molded from a glass filled polypropylene material, as describe previously in reference to support brackets 38 and 116.

It should be understood that exterior rearview mirror assemblies 10, 110 may also comprise manual adjust assemblies. In manual adjust assemblies, the reflective element and backing member are supported on an adapter plate which is pivotally mounted to a fixed base, such as support bracket 38 or 116. Furthermore, assemblies 10, 110 may include remote manual adjust assemblies, which include for example Bowden cables that connect to a remote actuator located within the vehicle. The Bowden cables extend from the remotely located actuator to an adapter member, which supports the reflective element assembly and which is pivotally mounted to a fixed base, for example support bracket 38 or 116, thus permitting adjustment of the reflective element assembles. In addition, any one of the remote adjust or remote manual adjust assemblies may be either a fixed position exterior rearview mirror assembly, similar to exterior rearview mirror assembly 110, or may comprise a break-away exterior rearview mirror assembly, similar to exterior rearview mirror assembly 10. Furthermore, while various forms of the invention have been shown and described other forms will now become apparent to those skilled in the art. For instance, the projecting members may be formed on the mounting bracket and the corresponding recesses may be formed on the support bracket. The embodiments of the invention shown in the drawings is not intended to limit the scope of the invention which is defined by the claims which follow.

Embodiments of the invention in which we claim exclusive property or privilege are defined as follows:

1. A rearview mirror support bracket for mounting a reflective element in an exterior rearview mirror assembly housing, said rearview mirror support bracket comprising:
   a polyolefin body comprising a polyolefin material having a flexural modulus of at least about 4.0 GPa, a mounting surface for mounting a reflective mirror elements, and an arm adapted to mount to a vehicle.

2. A rearview mirror support bracket according to claim 1, wherein said polyolefin body comprises a polypropylene body.

3. A rearview mirror support bracket according to claim 2, wherein said polypropylene body comprises a reinforced polypropylene body.

4. A rearview mirror support bracket according to claim 1, wherein said polyolefin body has a density in a range of about 1.1 to 1.35 g/cm$^3$.

5. A rearview mirror support bracket according to claim 4, wherein said polyolefin body has a density in a range of about 1.15 to 1.25 g/cm$^3$.

6. A rearview mirror support bracket according to claim 5, wherein said polyolefin body has a density in a range of about 1.20 to 1.25 g/cm$^3$.

7. A rearview mirror support bracket according to claim 1, wherein said polyolefin body has a flexural modulus of at least about 6.0 GPa.

8. A rearview mirror support bracket according to claim 7, wherein said polyolefin body has a flexural modulus of at least about 8.0 GPa.

9. A rearview mirror support bracket according to claim 1, wherein said polyolefin body is UV stabilized by incorporation of an ultraviolet stabilizer.

10. A rearview mirror support bracket according to claim 1, wherein said polyolefin body is impact modified by including a material therein providing said body with improved resistance to deformation and breaking.

11. A rearview mirror support bracket according to claim 1, wherein said polyolefin body comprises a fiber reinforced polyolefin body.

12. A rearview mirror support bracket according to claim 11, wherein said fiber reinforced polyolefin body is at least 25% fiber reinforced polyolefin.

13. A rearview mirror support bracket according to claim 12, wherein said fiber reinforced polyolefin is at least 35% fiber reinforced polyolefin.

14. A rearview mirror support bracket according to claim 13, wherein said fiber reinforced polyolefin is approximately 40% fiber reinforced.

15. A rearview mirror support bracket according to claim 11, wherein said fiber comprises at least one of glass fiber, mineral fiber, and carbon fiber.

16. A rearview mirror support bracket according to claim 15, wherein said fiber comprises glass fiber.

17. A rearview mirror support bracket according to claim 1, wherein said arm includes at least one of a projecting member and a recess for engaging a corresponding structure on a vehicle mounting bracket for releasably coupling said support bracket to the mounting bracket.

18. A rearview mirror support bracket according to claim 17, wherein said arm includes at least one insert of a material different from the polyolefin of said body, said insert having at least one raised portion defining said projecting member.

19. A rearview mirror support bracket according to claim 18, wherein said material of said insert which is different from the polyolefin of said body comprises one of a glass filled nylon and a metal.

20. A rearview mirror support bracket according to claim 18, wherein said arm includes a plurality of projecting members for releasably coupling said support bracket to the mounting bracket.

21. A rearview mirror support bracket according to claim 20, wherein said arm includes a collar having a transverse passage extending therethrough for receiving a pivot of a vehicle mounting bracket, said plurality projecting members being positioned on said collar and being circumferentially spaced around said passage.

22. A rearview mirror support bracket according to claim 21, wherein said collar supports a spring, said spring for urging said collar into engagement with a base of the vehicle mounting bracket for releasably coupling said mirror support bracket to the vehicle mounting bracket.

23. A rearview mirror support bracket according to claim 18, wherein said body is adapted to support an electrical actuator.

24. A rearview mirror support bracket according to claim 1, wherein said arm includes a plurality of inserts of a material different from the polyolefin of said body, each of said inserts including a raised portion, said raised portions defining a plurality of projecting members.

25. An exterior rearview mirror assembly comprising:
a housing having a reflective element; and
a support bracket supporting said reflective element in said housing, said support bracket comprising a polyolefin material having a flexural modulus of at least about 4.0 GPa and being adapted to mount to the vehicle.

26. A rearview mirror assembly according to clam 25, wherein said polyolefin material comprises polypropylene.

27. A rearview mirror assembly according to claim 26, wherein said polypropylene material has a density in a range of about 1.1 to 1.35 g/cm$^3$.

28. A rearview mirror assembly according to claim 27, wherein said polypropylene material has a density in a range of about 1.15 to 1.25 g/cm$^3$.

29. A rearview mirror assembly according to claim 28, wherein said polypropylene material has a density in a range of about 1.20 to 1.25 g/cm$^3$.

30. A rearview mirror assembly according to claim 26, wherein said polypropylene material has a flexural modulus of at least about 6.0 GPa.

31. A rearview mirror assembly according to claim 30, wherein said polypropylene material has a flexural modulus of at least about 8.0 GPa.

32. A rearview mirror assembly according to claim 26, wherein said polypropylene material is UV stabilized by incorporation of an ultraviolet stabilizer.

33. A rearview mirror assembly according to claim 26, wherein said polypropylene material is impact modified by including a material therein providing said body with improved resistance to deformation and breaking.

34. A rearview mirror assembly according to claim 26, wherein said polypropylene material comprises a fiber reinforced polypropylene.

35. A rearview mirror assembly according to claim 34, wherein said fiber comprises one of a glass fiber, a mineral fiber, and a carbon fiber.

36. A rearview mirror assembly according to claim 35, wherein said polypropylene comprises glass fiber reinforced polypropylene.

37. A rearview mirror assembly according to claim 34, wherein said glass fiber reinforced polypropylene material is at least 25% glass fiber reinforced polypropylene.

38. A rearview mirror assembly according to claim 34, further comprising a vehicle mounting bracket adapted to mount to the vehicle, said support bracket engaging said vehicle mounting bracket for mounting said housing and said support bracket to the vehicle.

39. A rearview mirror assembly according to claim 38, wherein said support bracket releasably engages said vehicle mounting bracket and is adapted to release from engagement with said vehicle mounting bracket when an external force is applied to said rearview mirror assembly.

40. A rearview mirror assembly according to claim 39, wherein said vehicle mounting bracket includes a base and a pivot extending from said base, said pivot supporting a spring, said support bracket including a collar having a transverse passage receiving said pivot, said collar being urged into engagement with said base by said spring, one of said base and said collar including a plurality of projections, and the other of said collar and said base including a plurality of recesses for releasably coupling said support bracket to said vehicle mounting bracket.

41. A rearview mirror assembly according to claim 40, wherein at least one of said projections comprises one of a metal insert and a plastic insert, said inserts being provided on said collar.

42. A rearview mirror assembly according to claim 40, wherein said projections comprise glass filled nylon inserts.

43. A rearview mirror assembly according to claim 40, wherein said collar includes a plurality of recesses, said inserts being positioned in said recesses and projecting from said collar to engage said base.

44. A rearview mirror assembly according to claim 40, wherein said inserts are circumferentially spaced around said transverse passage.

45. A rearview mirror assembly according to claim 40, wherein each of said inserts and said recesses includes camming surfaces for guiding said housing to rotate about said pivot when an external force is applied to said housing having sufficient magnitude to compress said spring.

46. A rearview mirror assembly according to claim 40, wherein said housing is mounted to said vehicle mounting bracket.

47. A rearview mirror assembly according to claim 34, further comprising an electrical actuator for adjusting the position of said reflective element in said housing.

48. An exterior rearview mirror assembly comprising:
   a housing having a reflective element;
   a support bracket supporting said reflective element in said housing and being secured to said housing, said support bracket comprising a polyolefin material having a flexural modulus of at least about 4.0 GPa; and
   a mounting bracket having a pivot and a plurality of recesses, said support bracket being pivotally mounted to said mounting bracket on said pivot and including a plurality of projections for releasably engaging said recesses to releasably mount said housing on said mounting bracket.

49. A rearview mirror assembly according to claim 48, wherein said polyolefin material comprises polypropylene.

50. A rearview mirror assembly according to claim 49, wherein said polypropylene material is UV stabilized by incorporation of an ultraviolet stabilizer.

51. A rearview mirror assembly according to claim 49, wherein said polypropylene material is impact modified by including a material therein providing said body with improved resistance to deformation and breaking.

52. A rearview mirror assembly according to claim 49, wherein said polypropylene material is reinforced polypropylene.

53. A rearview mirror assembly according to claim 52, wherein said reinforced polypropylene material comprises a fiber reinforced polypropylene material.

54. A rearview mirror assembly according to claim 53, wherein said fiber reinforced polypropylene material comprises at least 25% glass fiber reinforced polypropylene.

55. A rearview mirror assembly according to claim 49, wherein said vehicle mounting bracket includes a base, said pivot extending from said base and supporting a spring, said spring urging said projections into engagement with said recesses for releasably coupling said support bracket to said vehicle mounting bracket, said projections disengaging from said recesses when an external force is applied to said housing have sufficient magnitude to compress said spring.

56. A rearview mirror assembly according to claim 55, wherein at least one of said projections comprises one of a metal insert and a plastic insert.

57. A rearview mirror assembly according to claim 56, wherein support bracket includes a plurality of recesses, said inserts being positioned in said recesses and projecting from said support bracket to engage said base.

58. A rearview mirror assembly according to claim 56, wherein each of said inserts and said recesses include camming surfaces for guiding said housing to rotate about said pivot when an external force is applied to said housing having sufficient magnitude to compress said spring.

59. A rearview mirror assembly according to claim 55, wherein said projections comprise glass filled nylon inserts.

60. A rearview mirror assembly according to claim 49, further comprising an electrical actuator for adjusting the position of said reflective element in said housing.

61. An exterior rearview mirror assembly having a housing and a reflective element supported in said housing, wherein the improvement comprises:
   a polypropylene support bracket for mounting the reflective element in the housing and having a portion being adapted to mount to the vehicle, said polypropylene support bracket comprising a fiber reinforced polyolefin material having a flexural modulus of at least about 4.0 GPa.

62. A rearview mirror assembly according to claim 61, wherein said fiber comprises one of glass fiber, mineral fiber, and carbon fiber.

63. A rearview mirror assembly according to claim 61, wherein said fiber comprises at least 25% by weight of said polypropylene support bracket.

64. A rearview mirror assembly according to claim 63, wherein said polypropylene support bracket comprises a homopolymer polypropylene material.

65. A rearview mirror assembly according to claim 63, wherein said polypropylene support bracket has a density in a range of about 1.1 to 1.35 g/cm$^3$.

66. A rearview mirror assembly according to claim 65, wherein said polypropylene support bracket is impact modified by including a material therein providing said body with improved resistance to deformation and breaking.

67. A rearview mirror assembly according to claim 66, wherein said polypropylene support bracket is UV stabilized by incorporation of an ultraviolet stabilizer.

* * * * *